United States Patent
Jaiswal et al.

(10) Patent No.: US 10,994,825 B2
(45) Date of Patent: May 4, 2021

(54) PANEL ASSEMBLY INCLUDING STRINGER AND REINFORCEMENT ELEMENTS

(71) Applicant: Airbus Operations Limited, Bristol (GB)

(72) Inventors: Vimal Jaiswal, Bristol (GB); John Woolcock, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 154 days.

(21) Appl. No.: 16/059,704

(22) Filed: Aug. 9, 2018

(65) Prior Publication Data
US 2019/0047678 A1 Feb. 14, 2019

(30) Foreign Application Priority Data
Aug. 11, 2017 (GB) .................................... 1712914

(51) Int. Cl.
| | | |
|---|---|---|
| B64C 3/18 | (2006.01) | |
| B64C 3/26 | (2006.01) | |
| B64C 3/20 | (2006.01) | |
| B29C 70/00 | (2006.01) | |
| B64C 1/12 | (2006.01) | |

(52) U.S. Cl.
CPC .............. B64C 3/182 (2013.01); B29C 70/00 (2013.01); B64C 3/20 (2013.01); B64C 3/26 (2013.01); B64C 1/12 (2013.01)

(58) Field of Classification Search
CPC .. B64C 1/12; B64C 3/182; B64C 3/20; B64C 3/26; B29C 70/00; B32B 5/12; B32B 7/12

USPC ............... 244/123.1, 131, 132, 133; 428/105
See application file for complete search history.

(56) References Cited

U.S. PATENT DOCUMENTS

| | | | |
|---|---|---|---|
| 3,837,985 A | | 9/1974 | Chase |
| 3,995,080 A | * | 11/1976 | Cogburn ................. B64C 1/064 428/34.5 |
| 3,995,081 A | * | 11/1976 | Fant ...................... B29C 70/865 428/119 |

(Continued)

FOREIGN PATENT DOCUMENTS

| | | |
|---|---|---|
| EP | 2 808 156 | 12/2014 |
| WO | 2012/042246 | 4/2012 |
| WO | 2014/065719 | 5/2014 |

OTHER PUBLICATIONS

European Examination Report for European Application No. EP18186319.2, five pages, dated Mar. 12, 2020.

(Continued)

*Primary Examiner* — Richard R. Green
*Assistant Examiner* — Brady W Frazier
(74) *Attorney, Agent, or Firm* — Nixon & Vanderhye P.C.

(57) ABSTRACT

A panel assembly with a panel and a stringer is disclosed. The stringer has a stringer foot and an upstanding stringer web. The stringer foot has a flange which extends in a widthwise direction between the stringer web and a lateral edge and in a lengthwise direction alongside the stringer web, and a foot run-out which extends between the flange and a tip of the stringer foot. The foot run-out is bonded to the panel at a foot run-out interface. Reinforcement elements, such as tufts, pass through the foot run-out interface. At least some of the reinforcement elements are inclined relative to the foot run-out interface.

17 Claims, 10 Drawing Sheets

(56) References Cited

U.S. PATENT DOCUMENTS

| | | | | |
|---|---|---|---|---|
| 4,109,435 A * | 8/1978 | Loyd | ..................... | B29C 65/562 |
| | | | | 52/309.1 |
| 4,113,910 A * | 9/1978 | Loyd | ..................... | B29C 66/112 |
| | | | | 428/162 |
| 4,350,728 A * | 9/1982 | Huang | ..................... | B29C 66/45 |
| | | | | 428/105 |
| 5,827,383 A | 10/1998 | Campbell et al. | | |
| 5,876,540 A | 3/1999 | Pannell | | |
| 6,830,286 B2 | 12/2004 | Bechtold et al. | | |
| 2005/0077427 A1 * | 4/2005 | Brenner | ..................... | B64C 1/12 |
| | | | | 244/117 R |
| 2005/0211846 A1 * | 9/2005 | Leon-Dufour | .......... | B64C 3/182 |
| | | | | 244/126 |
| 2010/0127122 A1 | 5/2010 | Cosentino | | |
| 2010/0237195 A1 * | 9/2010 | Stephan | ..................... | B64C 1/12 |
| | | | | 244/132 |
| 2013/0164489 A1 * | 6/2013 | Gaitonde | ................ | B23P 19/00 |
| | | | | 428/99 |
| 2013/0273301 A1 * | 10/2013 | Zuardy | .................. | B64D 45/00 |
| | | | | 428/98 |
| 2013/0313391 A1 | 11/2013 | Fonseka | | |
| 2014/0250665 A1 * | 9/2014 | Choi | ..................... | B29C 66/474 |
| | | | | 29/432 |
| 2014/0377501 A1 * | 12/2014 | Joern | ..................... | B29C 65/72 |
| | | | | 428/132 |
| 2017/0174313 A1 * | 6/2017 | Brakes | ..................... | B64C 3/20 |
| 2017/0225769 A1 * | 8/2017 | Carlson | .................. | B29C 70/34 |

OTHER PUBLICATIONS

Combined Search and Examination Report for GB1712914.9, dated Jan. 29, 2018, 6 pages.

James Kratz et al., "Improving the Damage Tolerance of Composite Joints With Tufting", $20^{th}$ International Conference on Composite Materials, Copenhagen, Jul. 19-24, 2015, 10 pages.

Denis D.R. Cartie et al., "3D reinforcement of stiffener-to-skin T-joints by Z-pinning and tufting", Engineering Fracture Mechanics, 73 (2006), pp. 2532-2540.

Diego Lombetti, "Tufting of Complex Composite Structures", Cranfield University, 2015, 255 pages.

* cited by examiner

FIG. 15 widthwise ↔
lengthwise ↕

PANEL ASSEMBLY INCLUDING STRINGER AND REINFORCEMENT ELEMENTS

RELATED APPLICATION

This application claims priority of United Kingdom Patent Application GB 1712914.9 filed Aug. 11, 2017, the entirety of which is incorporated by reference.

FIELD OF THE INVENTION

The present invention relates to a panel assembly, typically but not exclusively for a composite skin of an aircraft wing.

BACKGROUND OF THE INVENTION

The design of stringer run-outs in composite skins of aircraft wings presents a great technical challenge. High shear and peel stresses can develop locally at the run-out causing the stringer to peel off from the skin. Out of plane stresses develop at the tip of the run-out and since composites are poor in out-of-plane strength, cracks are prone to form at the tip. Additionally, composites are poor in Mode-1 fracture toughness, so these cracks may grow.

A known solution is to clamp the run-out to the skin with a metallic finger plate which is bolted to the stringer foot and skin, as disclosed in US2013/0313391.

SUMMARY OF THE INVENTION

A first aspect of the invention provides a panel assembly comprising: a panel; a stringer comprising a stringer foot and an upstanding stringer web, wherein the stringer foot comprises a flange which extends in a widthwise direction between the stringer web and a lateral edge and in a lengthwise direction alongside the stringer web, and a foot run-out which extends between the flange and a tip of the stringer foot, wherein the foot run-out is bonded to the panel at a foot run-out interface; and reinforcement elements which pass through the foot run-out interface, wherein at least some of the reinforcement elements are inclined relative to the foot run-out interface.

It has been found that inclined reinforcement elements in the foot run-out significantly reduce the chance of a crack spreading by shear, or even forming in the first place, compared with non-inclined (vertical) reinforcement elements.

Preferably at least some of the reinforcement elements are inclined at an oblique angle of inclination relative to the foot run-out interface and in a direction of inclination which is either towards or away from the tip of the stringer foot and defines an angle of azimuth relative to the lengthwise direction, wherein the angle of azimuth is between −45° and +45°, or between −20° and +20°, or between −10° and +10°. This means that the direction of inclination is at least partially aligned with the lengthwise direction. The tip of the stringer foot defines a tip plane orthogonal to the lengthwise direction. The direction of inclination is either towards or away from the tip of the stringer foot in the sense that it is towards or away from the tip plane.

In some embodiments the angle of azimuth varies between the reinforcement elements.

Optionally some of the reinforcement elements are inclined towards the tip of the stringer foot, and some of the reinforcement elements are inclined away from the tip of the stringer foot.

Preferably the reinforcement elements are bonded to the foot run-out and/or the panel. This enhances the mechanical performance of the reinforcement elements, prevents leakage problems associated with bolts, and also avoids the structural weakness and lightning strike problems associated with drilled bolt holes.

Preferably each reinforcement element has a diameter less than 1 mm or less than 2 mm.

By way of example, the reinforcement elements may be tufts, Z-pins, or fasteners such as bolts or rivets.

Preferably the foot run-out comprises multiple plies (typically fibre-reinforced composite plies); and the reinforcement elements pass through some or all of the plies of the foot run-out.

Preferably the panel comprises multiple plies (typically fibre-reinforced composite plies); and the reinforcement elements pass through some or all of the plies of the panel.

Preferably the foot run-out and/or the panel are made from a fibre-reinforced composite material.

Preferably the panel has a thickness at the foot run-out interface, and at least some of the reinforcement elements are spaced from the tip of the stringer foot at the point of passing through the foot run-out interface by a distance less than the thickness of the panel at the foot run-out interface.

The stringer web may have the same height along the entire length of the stringer, but more typically it comprises a web run-out which upstands by a height from the stringer foot and terminates at a tip of the stringer web, the height of the web run-out reduces towards the tip of the stringer web, and the foot run-out coincides with the web run-out.

Preferably the stringer web upstands by a maximum height H from the stringer foot, and at least some of the reinforcement elements are spaced from the tip of the stringer foot at the point of passing through the foot run-out interface by a distance less than H.

The stringer may have a variety of cross-sectional shapes, including T-shaped, L-shaped, omega (or top-hat) shaped, or J-shaped.

The web may stop short of the foot run-out, so the foot run-out extends further than the web in the lengthwise direction. Alternatively the web may terminate in the same plane as the tip of the foot run-out.

A second aspect of the invention provides an aircraft wing comprising an upper skin and a lower skin, wherein the upper skin comprises a panel assembly according to the first aspect of the invention, the reinforcement elements in the upper skin each have a first portion in the foot run-out and a second portion in the panel, and some or a majority of the reinforcement elements in the upper skin are inclined in a direction of inclination which is towards the tip of the stringer foot so that the first portion is closer to the tip of the stringer foot than the second portion.

A third aspect of the invention provides an aircraft wing comprising an upper skin and a lower skin, wherein the lower skin comprises a panel assembly according to the first aspect of the invention, the reinforcement elements in the lower skin each have a first portion in the foot run-out and a second portion in the panel, and some or a majority of the reinforcement elements in the lower skin are inclined in a direction of inclination which is away from the tip of the stringer foot so that the first portion is further from the tip of the stringer foot than the second portion.

The second and third aspects of the invention may be combined in a single aircraft wing, so the reinforcement elements are inclined in opposite directions in the upper and lower skins.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
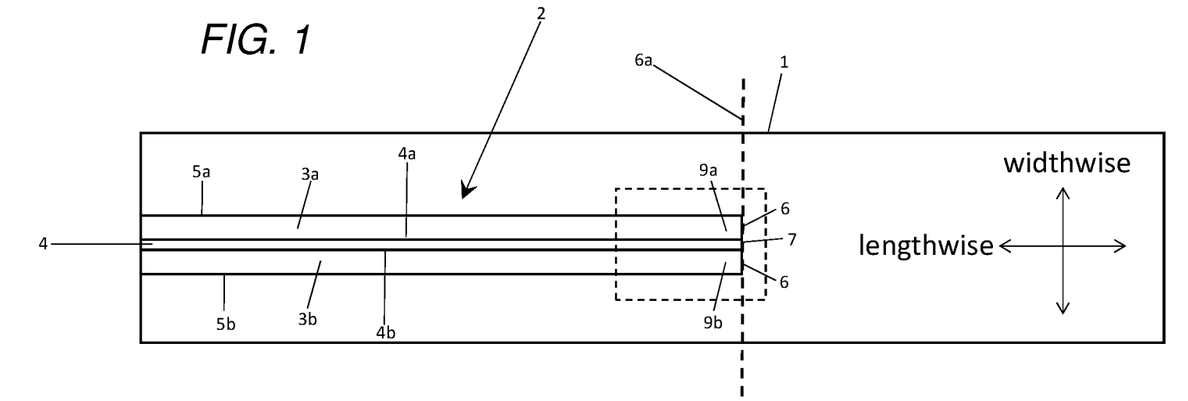
FIG. 1 is a plan view of a panel assembly.

A panel assembly shown in FIGS. 1-5 comprises a panel 1 carrying multiple stringers 2. Only one of the stringers is shown in FIG. 1, but three of the stringers are shown side-by-side in FIG. 3. All of the stringers are similar, so only the stringer 2 shown in FIG. 1 will be described in detail.

Figure 2:
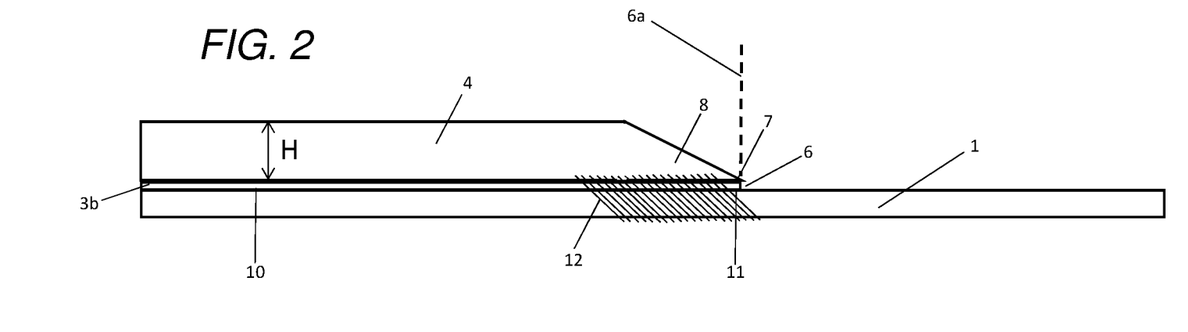
FIG. 2 is a sectional side view of the panel assembly of FIG. 1.
Figure 3:
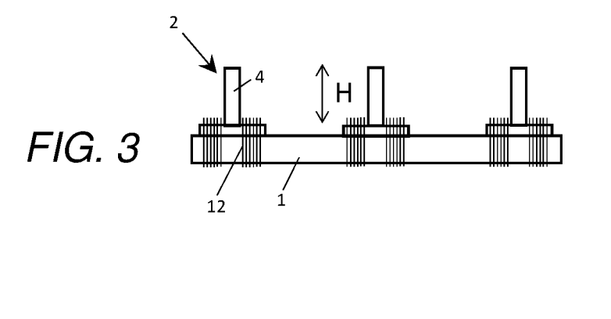
FIG. 3 is a sectional end view of the panel assembly of FIG. 1 showing multiple stringers.
Figure 4:
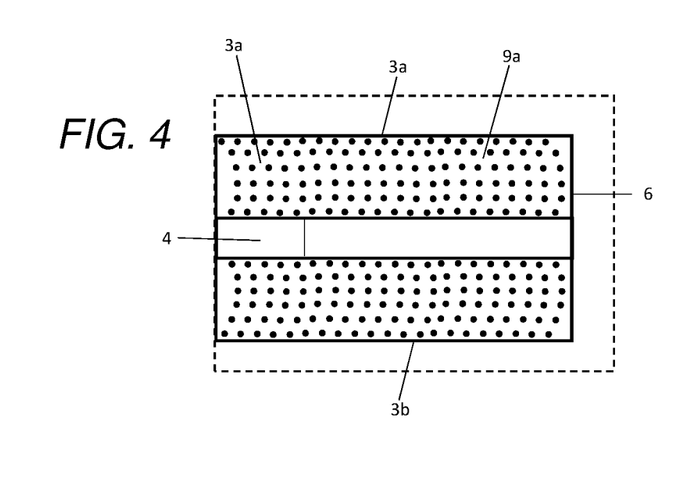
FIG. 4 is an enlarged plan view of the stringer run-out.

The stringer 2 has a T-shaped cross-section as shown in FIG. 3, with a stringer foot and an upstanding stringer web 4. The stringer web 4 upstands by a maximum height H from the stringer foot as shown in FIGS. 2 and 3. At the end of the stringer web 4 there is a web run-out 8 which terminates at a tip 7. The web run-out 8 tapers so that the height of the web run-out 8 reduces towards the tip 7 as shown in FIG. 2.

The stringer foot has two symmetrical halves: a flange 3a and foot run-out part 9a on one side of the web; and a flange 3b and foot run-out part 9b on the other side of the web. The majority of the stringer foot comprises the flanges 3a,b which each extend in a widthwise direction between the stringer web 4 and a respective lateral edge 5a,b. Each flange 3a,b also extends in a lengthwise direction alongside the stringer web 4 up to a respective foot run-out part 9a,b which coincides with the tapering web run-out 8. The foot run-out parts 9a,b each extend in the lengthwise direction between a respective flange 3a,b and a tip 6 of the stringer foot. The tip 6 of the stringer foot is a straight edge running in the widthwise direction perpendicular to the lengthwise direction, although other geometries may be possible. The first foot run-out part 9a extends in the widthwise direction between a first side 4a of the stringer web and a first lateral edge, and the second foot run-out part 9b extends in the widthwise direction between a second side 4b of the stringer web opposite the first side 4a of the stringer web and a second lateral edge. In this example the tip 7 of the web and the tip 6 of the stringer foot all lie in the same tip plane 6a perpendicular to the lengthwise direction.

FIG. 1 shows only one end of the stringer 2. The opposite end of the stringer may be similar, or different to the end of the stringer shown in FIG. 1. The flanges 3a,b run along the full length of the stringer between the foot run-out parts 9a,b and the opposite end of the stringer. The stringer foot 3a,3b,9a,9b is bonded to the panel at a stringer/panel interface (or bondline) which runs the full length of the stringer. The stringer/panel interface comprises a flange interface 10 where the flanges 3a,b are bonded to the panel, and a foot run-out interface 11 where the foot run-out parts 9a,b are bonded to the panel.

Figure 5:
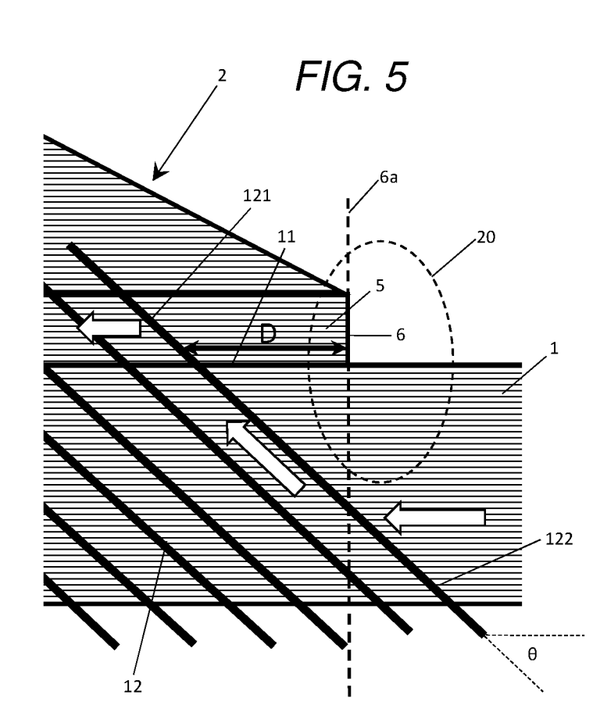
FIG. 5 is an enlarged sectional side of the of the stringer run-out.

The panel 1 and the stringer 2 are both made from fibre-reinforced composite materials. More specifically— the panel 1 comprises multiple plies of fibre-reinforced composite material, such as carbon fibres impregnated or infused with an epoxy resin matrix. The stringer 2 is typically made from a similar (or the same) composite material. That is, the stringer foot 3a,3b,9a,9b and the stringer web 4 are made from multiple plies of fibre-reinforced composite material, such as carbon fibres impregnated or infused with an epoxy resin matrix. Although the stringer foot is illustrated schematically in FIG. 3 as separate from the stringer web 4, in a preferred embodiment the stringer 2 is constructed as two back-to-back L-section pieces—as shown in FIG. 1 of U.S. Pat. No. 5,827,383 for example. FIG. 5 is an enlarged view of the end of the stringer 2 and the panel 1, the horizontal shading indicating the planes of the plies of fibre-reinforced composite material. The panel assembly is manufactured by assembling dry fibre preforms (i.e. carbon fibre without any epoxy resin matrix) then injecting the preforms with epoxy resin matrix material to simultaneously infuse the panel 1 and the stringers 2. This infusion process fully wets the carbon fibre preforms, and the curing of the resin forms bonded joints between the individual plies, and a bonded joint between the stringer 2 and the panel 1 at the stringer/panel interface 10,11.

Reinforcement elements 12, shown in detail in FIG. 5, pass through the full thickness of the stringer foot and the full thickness of the panel 1. In a preferred embodiment each reinforcement element 12 is a tuft—that is, a loop of fibre such as carbon-fibre. The individual tufts 12 may be connected to adjacent tufts by seams, or more typically they are independent with no seams. In other embodiments the reinforcement elements 12 may be Z-pins made of carbon-fibre, steel, copper or any other suitable material. In the following description the reinforcement elements 12 will be referred to as tufts.

Figure 6:
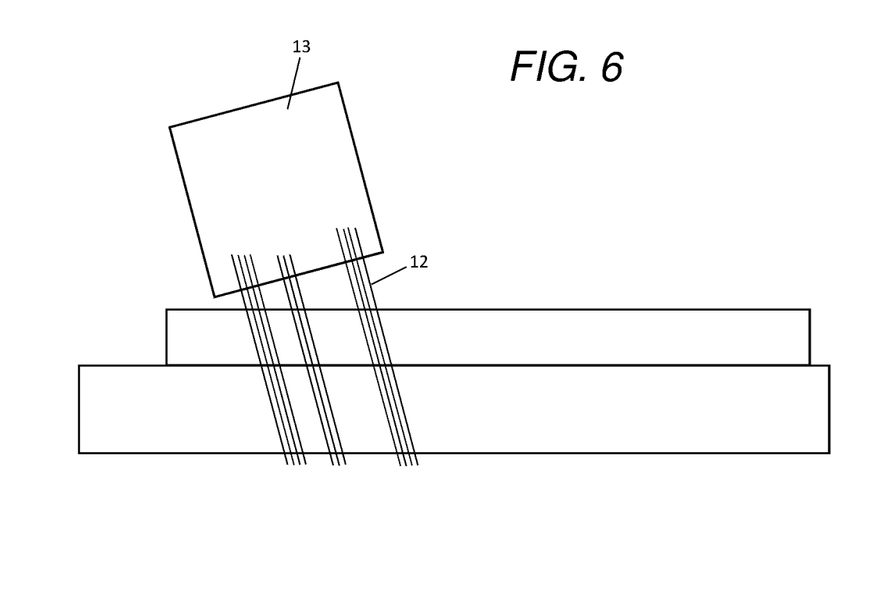
FIG. 6 is a schematic view of a tufting head inserting tufts.

FIG. 6 is a schematic view of a tufting head 13 inserting the tufts 12. The tufts are inserted simultaneously, each tuft being inserted by a respective needle inclined at the necessary angle and direction of inclination. An imprint of the required tufting parameters (angle, pattern, density, and profile) is defined in the tufting head 13.

The tufts 12 are inserted before the infusion process, so the infusion process fully wets the tufts, and the curing of the resin forms bonds between the tufts and the resin. Alternatively, the tufts 12 may be inserted after infusion, or the stringers and panel may be laid up as wet prepreg (resin-impregnated carbon fibre).

Figure 7:
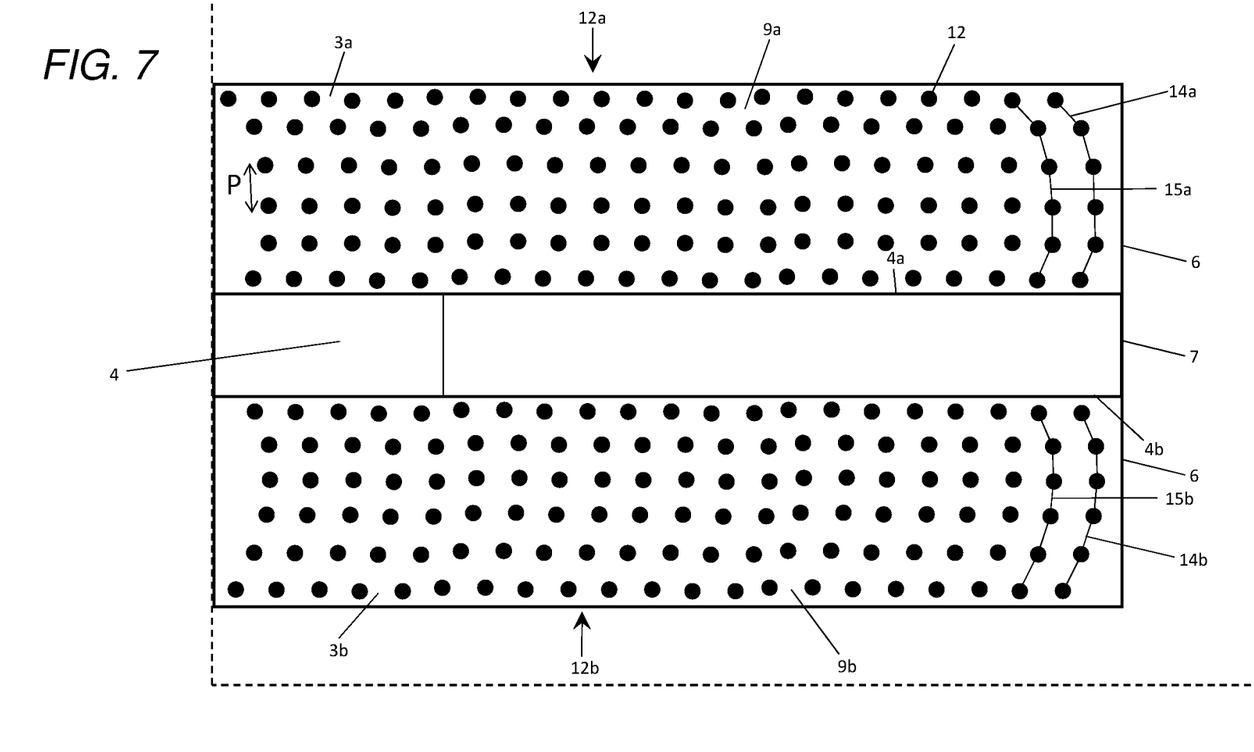
FIG. 7 is an enlarged plan view of the stringer run-out.

As shown in FIG. 7, the tufts 12 are distributed across the full extent of the foot run-out parts 9a,b and also across part of the flanges 3a,b. As shown in FIG. 5, the tufts pass through the foot run-out interface 11 from the foot run-out parts 9a,b into the panel 1. A small number of the tufts are also inserted into the flanges 3a,b—these tufts passing through the flange interface 10 between the flanges and the panel. The rest of each flange is free of tufts as shown in FIG. 2. In other examples, the tufts may only cover part of the foot run-out parts 9a,b.

The tufts are distributed in first and second series 12a,b of rows which pass through the first 9a and second 9b foot run-out parts respectively. The first series 12a has twenty-one rows, and the second series 12b also has twenty-one rows. Each series 12a,b includes an end row nearest to the tip 6 of the stringer foot and twenty further rows spaced progressively further back from the tip of the stringer foot. As indicated in FIG. 7, the rows of the first series 12a extend laterally away from the first side 4a of the stringer web towards the first lateral edge, and the rows of the second series 12b extend laterally away from the second side 4b of the stringer web towards the second lateral edge. The end row of the first series 12a consists of six tufts which are distributed along a first polygonal curve 14a which is not a straight line, and the end row of the second series 12b consists of six tufts which are distributed along a second polygonal curve 14b which is also not a straight line.

Polygonal curves 14a,b and 15a,b are indicated in FIG. 7 for the end rows and one of the further rows, but not for the other rows. Note that the polygonal curves indicated in FIG. 7 are constructed from imaginary straight line segments connecting the tufts. So the straight line segments shown in FIG. 7 do not indicate seams between the tufts (although optionally there may be seams which follow these lines). Note that the corner of each foot run-out part 9a,b next to the tip 6 is free of tufts.

In this example each row consists of six tufts, but in other embodiments there may be more tufts (for instance sixteen per row) or fewer tufts (for instance three, four or five per row). The centre-to-centre pitch between the adjacent tufts in each row does not vary substantially along each row. In this example the average centre-to-centre pitch (labelled P in FIG. 7) along a row is 3.5 mm and the diameter of each tuft is 0.5 mm. The centre-to-centre pitch may vary slightly either side of the average along a row, but preferably by no more than 20% (0.7 mm). The centre-to-centre pitch between rows is also approximately 3.5 mm.

In this example, each row has the same number of tufts so the centre-to-centre pitch P does not vary from row-to-row. In another example, the number of tufts per row may increase from row-to-row away from the tip 6, so the centre-to-centre pitch P decreases from row-to-row.

Each polygonal curve has a "C" shape with a convex side facing the tip 6 of the stringer foot and a concave side facing away from the tip 6 of the stringer foot. Each polygonal curve may have a portion where adjacent line segments are co-linear, that is, they lie in a straight line. For instance, the polygonal curve 14a includes two adjacent line segments which are co-linear. However, none of the polygonal curves are entirely straight.

Figure 8:
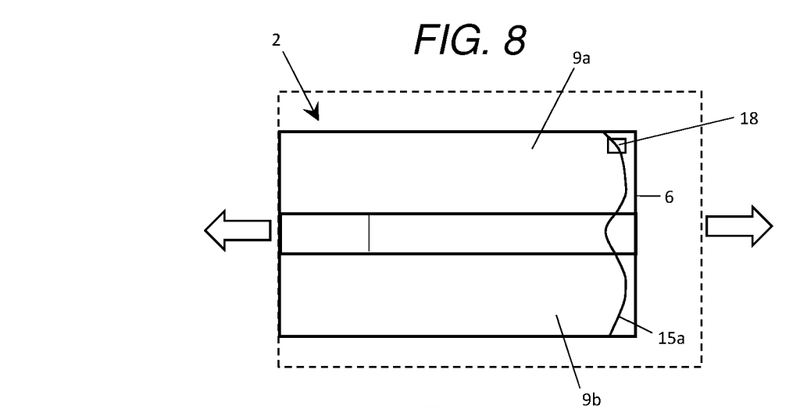
FIGS. 8-11 are plan views of a test specimen showing crack profiles and data points.
Figure 9:
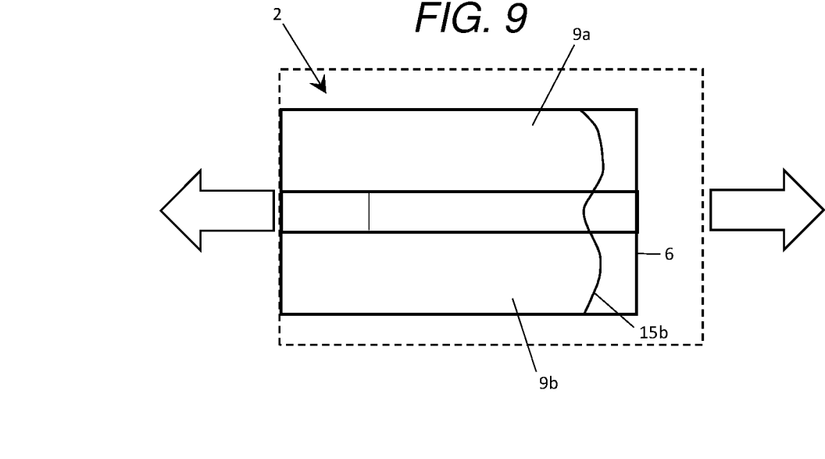
Figure 10:
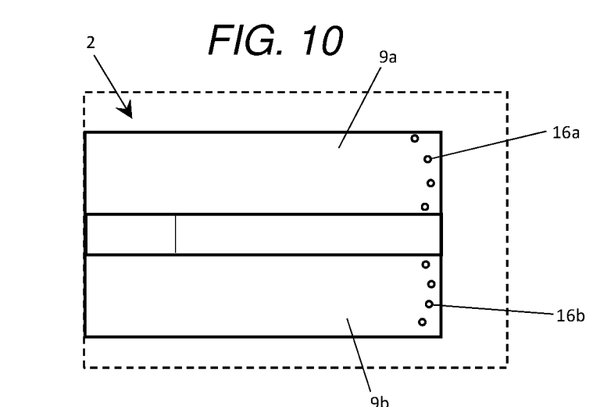
Figure 11:
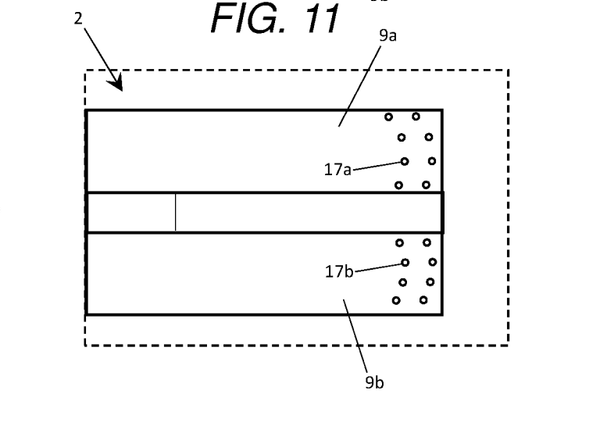

The distribution pattern for the tufts 12 is determined in a design phase shown in FIGS. 8-11. FIGS. 8 and 9 illustrate a failure test of a test specimen with the same structure as the panel assembly of FIG. 1, except with only a single stringer. The test specimen is stressed by applying a tensile force indicated by arrows, the size of the arrows in FIGS. 8 and 9 indicating the size of the force. The tensile force is applied by holding the panel and stringer at one end, and holding just the panel at the other end. The force is increased in a series of equal steps. FIG. 8 shows the test specimen at the end of a first step, when a crack has formed at the tip 6 of the stringer foot and propagated along the length of the stringer 2 to the position indicated 15a. A small ultrasonic probe 18 is scanned across the back of the panel 1. An ultrasonic signal is transmitted through the test specimen and echo signals are received. Diminished strength of the echo signal at a particular location defines the presence of a crack (or start of the crack front). The crack locations are marked on the test specimen to obtain a first pair of rows of data points 16a,b shown in FIG. 10 corresponding with the crack profile of FIG. 8. An approximate smooth curve over the data points is drawn to represent the crack front. Then the force is increased so that the crack moves to the position indicated in FIG. 9 at 15b. The ultrasonic inspection device 18 is scanned again across the foot run-out parts 9a,b to obtain a second pair of rows of data points 17a,b shown in FIG. 11 corresponding with the crack profile of FIG. 9. The process is repeated to obtain a full set of data points.

After the design phase of FIGS. 8-11, in a reinforcement phase the tufts 12 are inserted through the foot run-out interface in the distribution pattern of FIG. 7, using the series of rows of data points from the design phase as a guide to determine the distribution pattern.

In another embodiment, during the design phase, a finite element analysis (FEA) is performed on a computer model of the assembly (consisting of the stringer, panel, run-out and tufts) to theoretically predict the crack profile and number of tufts needed in each row to contain the crack growth. This analysis is performed by a suitably programmed computer to obtain the series of rows of data points 16a,b;17a,b each row corresponding with a respective theoretical crack profile.

Figure 12:
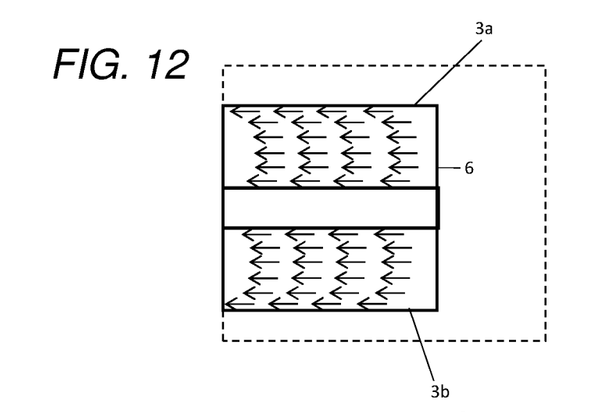
FIG. 12 is a plan view of a stringer run-out with tufts inclined directly away from the tip of the stringer.

As shown in FIG. 5, the tufts are inclined at an oblique angle of inclination θ relative to the foot run-out interface 11, in this case about 45° although this angle may vary. Each tuft 12 has a first (upper) portion 121 in the foot run-out 9a,b and a second (lower) portion 122 in the panel 1. The tufts are inclined in a direction of inclination which is away from the tip 6 of the stringer foot, so that the first portion 121 is further from the tip 6 of the stringer foot than the second portion 122. The direction of inclination of the tufts is also parallel with the lengthwise direction as shown in FIG. 12. Each arrow in FIG. 12 indicates a tuft, with the arrow head showing the direction of inclination. So as shown in FIG. 12 all of the tufts are inclined directly away from the tip 6 of the stringer foot in the lengthwise direction.

Figure 13:
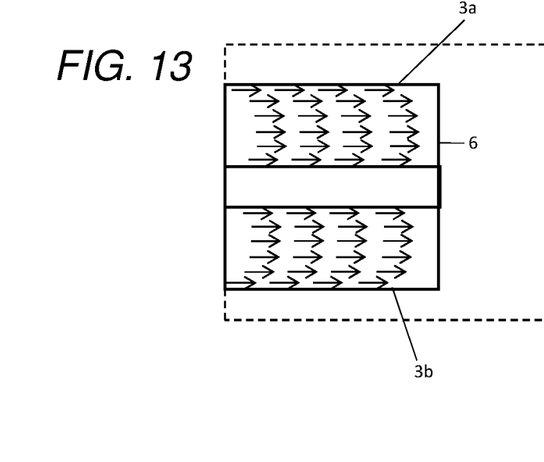
FIG. 13 is a plan view of a stringer run-out with tufts inclined directly towards the tip of the stringer.

FIG. 13 shows an alternative embodiment in which the tufts are inclined in the opposite direction, towards the tip 6 of the stringer foot.

Figure 14:
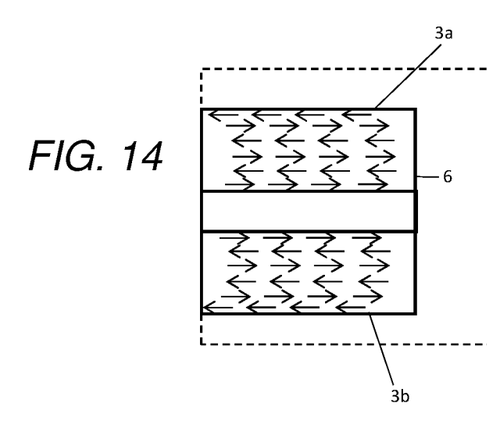
FIG. 14 is a plan view of a stringer run-out with tufts inclined in alternating directions.

FIG. 14 shows a further alternative embodiment in which columns of tufts are inclined in alternating senses, towards and away from the tip 6 of the stringer foot.

Figure 15:
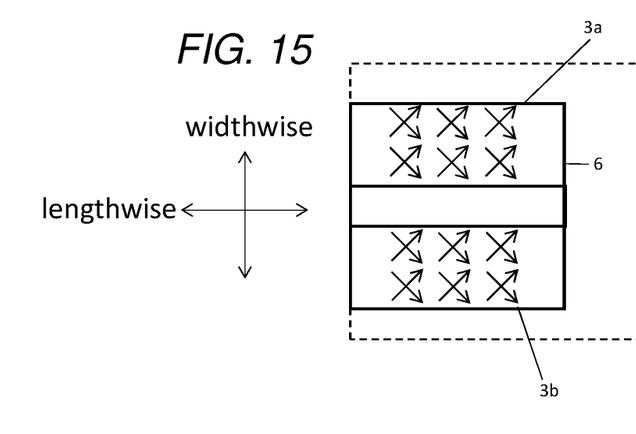
FIG. 15 is a plan view of a stringer run-out with tufts inclined towards the tip of the stringer with an angle of azimuth of +1-45°.

FIG. 15 shows a further alternative embodiment in which the tufts are inclined towards the tip 6 of the stringer foot, but the direction of inclination is not parallel with the lengthwise direction but rather defines an angle of azimuth of +/−45°. In another embodiment, the arrows in FIG. 15 could be reversed so that the tufts are inclined away from the tip 6 of the stringer foot.

Figure 16:
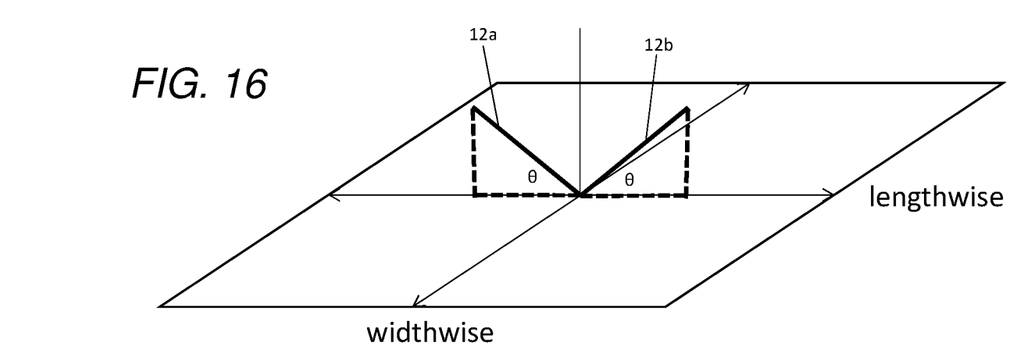
FIG. 16 shows two tufts inclined with an angle of azimuth of 0°.
Figure 17:
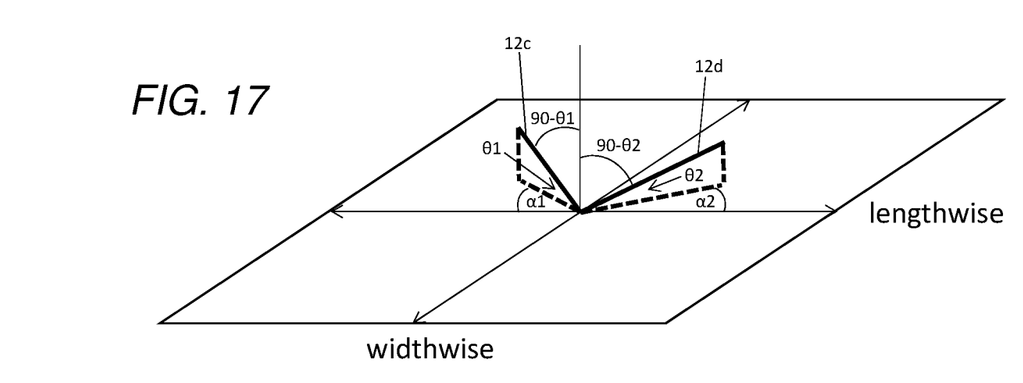
FIG. 17 shows two tufts inclined with different angles of inclination and different angles of azimuth.

FIGS. 16 and 17 illustrate the difference between the angle of inclination and the angle of azimuth for the tufts. FIG. 16 shows a tuft 12a angled away from the stringer tip as in FIG. 12, and a tuft 12b angled towards the stringer tip as in FIG. 13. In each case the orthogonal projection of the tuft onto the plane of the foot run-out interface 11 is parallel with the lengthwise direction, so the angle of azimuth relative to the lengthwise direction is zero.

FIG. 17 shows a first tuft 12c angled away from the stringer tip with an angle of inclination θ1, and a second tuft 12d angled towards the stringer tip with an angle of inclination θ2. In this case the orthogonal projection of each tuft onto the plane of the foot run-out interface 11 is not parallel with the lengthwise direction. Rather the orthogonal projection of the first tuft 12c defines an angle of azimuth α1 relative to the lengthwise direction, and the orthogonal projection of the second tuft 12d defines an angle of azimuth α2 relative to the lengthwise direction. In the case of FIG. 15, half of the tufts have an angle of azimuth α of +45°, and the other half of the tufts have an angle of azimuth α of −45°.

In the case of FIGS. 12 and 13, the angle of azimuth is shown as precisely zero, but in practice manufacturing tolerances will mean that the angle of azimuth of each tuft may deviate from zero by up to 5°, 10° or 15°. However, as long as the angle of azimuth is sufficiently low then the inclined tufts will be sufficiently aligned with the lengthwise direction to provide advantages compared with vertical tufts.

Deformation around the run-out is highly dependent on the geometrical features which lead to formation of the crack and the crack growth. Based on the geometry and the loads, peak tensile and shear stresses are developed at the tip of the run-out or at the crack front after formation of the crack. When vertical tufts are placed behind the crack front (supposing the crack has formed and passed through the tufts) then the tufts reduce the through-thickness tensile stress at the crack tip. However, they do not significantly affect the transverse shear stress. Inclining the tufts behind the crack front considerably reduces the peak tensile and the shear stresses at the crack tip.

Figure 18:
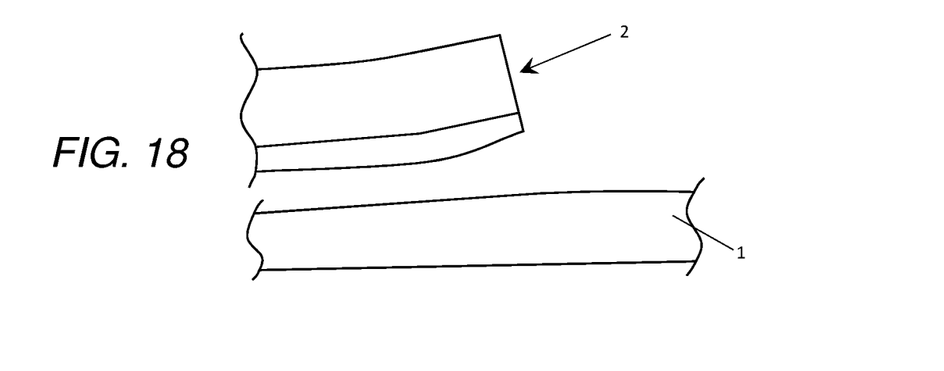
FIG. 18 is a sectional side view of a stringer and panel with no tufts, showing the deformation of the stringer and panel predicted by a finite element analysis (FEA) model.
Figure 19:
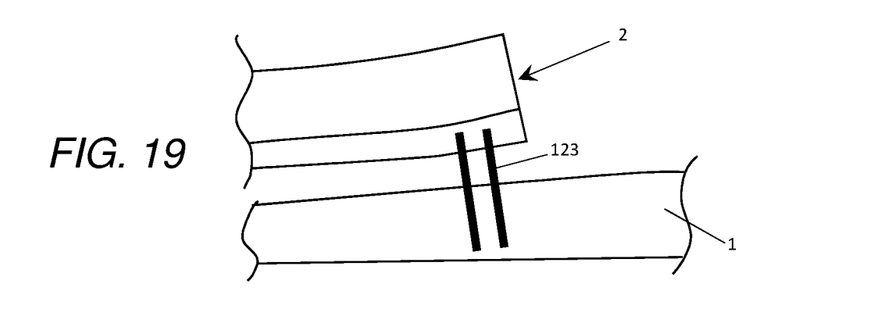
FIG. 19 is a sectional side view of a stringer and panel with vertical tufts.
Figure 20:
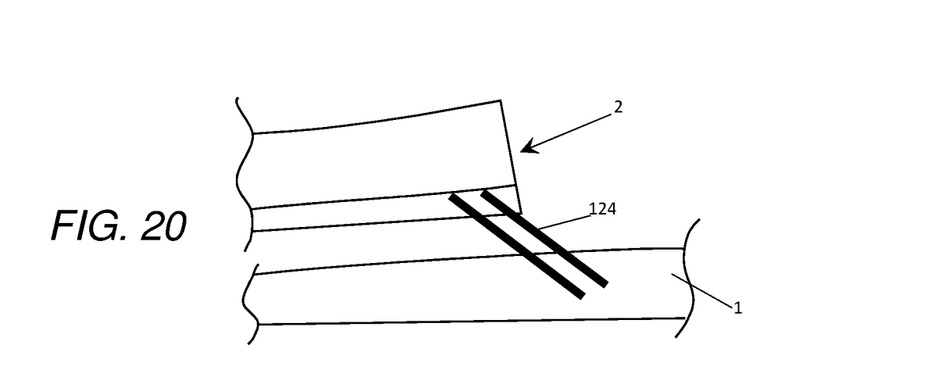
FIG. 20 is a sectional side view of a stringer and panel with inclined tufts.

FIG. 18 is a view of a stringer 2 and panel 1 with no tufts, showing the deformation of the stringer and panel predicted by a finite element analysis (FEA) model after a crack has propagated between them. Note that there is a distinct upward kink at the tip of the stringer 2. FIG. 19 shows the output of the same FEA model but with vertical tufts 123. Note that the kink is still present. FIG. 20 shows the output of the same FEA model but with tufts 124 inclined away from the tip of the stringer. Note that there is no kink in the stringer run-out. This relative lack of deformation of the stringer run-out is beneficial because it reduces tensile and shear stresses at the crack front.

The inclined tufts modify the local load path as shown in FIG. 5—the arrows indicating the load path from the panel 1 to the stringer 2 via the inclined tufts. This results in reduced load flow in a local zone 20 at the tip of the stringer minimising the chance of formation of a crack in this local zone. Calculations show that for a tufting density of 4%, the shear stiffness of the joint is doubled for tufts inclined at 45° in the region that is still bonded, which will alleviate the transverse shear stresses at the crack front or at the tip of the run-out before a crack is formed, thereby reducing the chance of a crack spreading by shear, or even forming in the first place. Beneficially, the first row of inclined tufts is sufficiently close to the tip 6 that they extend through the plane 6a of the tip as shown in FIG. 5.

The first row of tufts is positioned as close as possible to the tip 6 of the stringer foot, in order to provide this reduced load flow in the local zone 20. In the case of FIG. 5, the distance D between the first row of tufts and the tip 6 of the foot run-out, at the point where the tuft passes through the interface 11, is less than the thickness of the panel 1 at the interface 11. The thickness of the panel 1 at the interface 11 could vary—for example it might be between 3 mm and 10 mm. Typically the distance D is greater than 3.5 mm but less than 10 mm.

Figure 21:
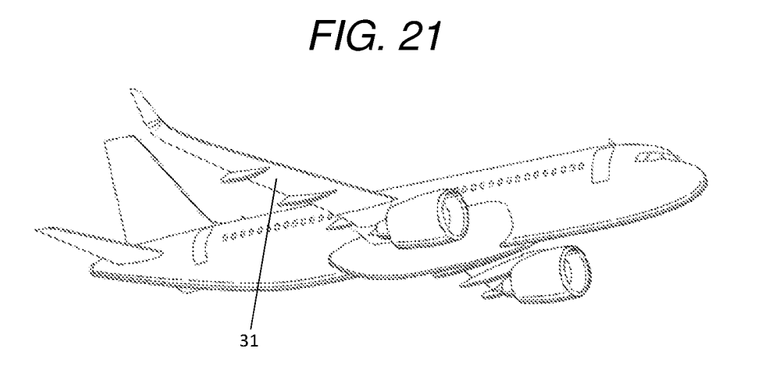
FIGS. 21 and 22 show an aircraft.
Figure 22:
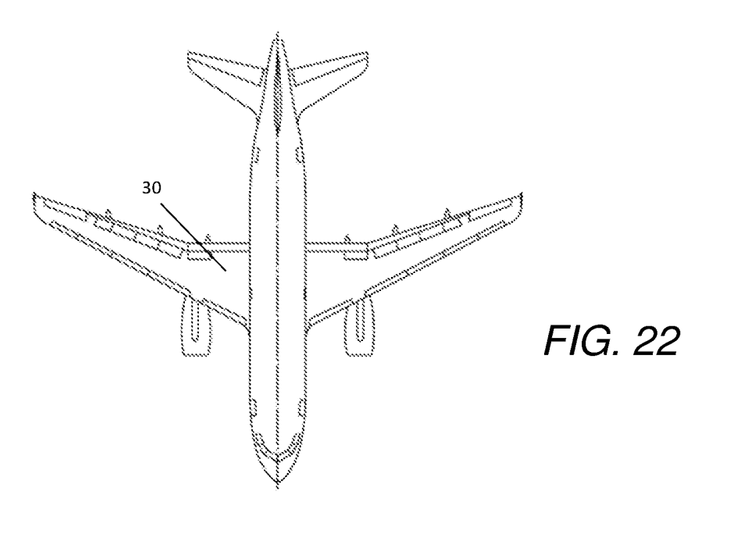
Figure 23:
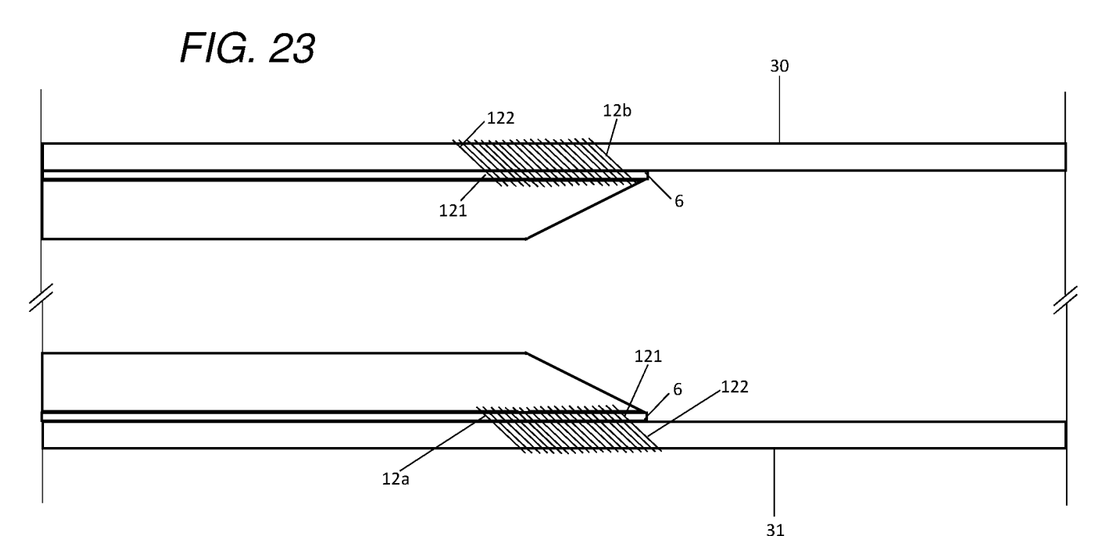
FIG. 23 is a sectional side view showing the upper and lower skins of one of the aircraft wings.

FIGS. 21 and 22 show an aircraft with a pair of wings. Each wing has an upper (low pressure) skin 30 and a lower (high pressure) skin 31. FIG. 23 is a schematic sectional view through one of the aircraft wings showing only the upper and lower skins 30, 31. Each skin comprises a panel assembly as shown in FIGS. 1-5, so it will not be described again in detail. The wing is attached to the fuselage at its root, and extends in a spanwise direction to its tip. The stringers extend in the spanwise direction from an inboard end at the root of the wing to an outboard end towards the tip of the wing. FIG. 23 shows only the outboard end of the stringer 2. The inboard end of the stringer typically has a different construction, running into the wing root joint and being held down by cleats for example.

The aerodynamic loads acting on the wing cause it to bend upwards so the lower skin is in tension. Therefore in the lower skin 31 the tufts are inclined in a direction of inclination which is away from the tip of the stringer foot. So the first (upper) portion 121 of each tuft in the stringer foot is further from the tip 6 of the stringer foot than the second (lower) portion 122 of the tuft in the lower skin 31.

The upward bending of the wing causes the upper skin 30 to be in compression, so the direction of inclination of the tufts is reversed compared with the lower skin. So in the upper skin the tufts are inclined in a direction of inclination which is towards the tip 6 of the stringer foot, so that the first (lower) portion 121 of each tuft in the stringer foot is closer to the tip 6 of the stringer foot than the second (upper) portion 122 of the tuft in the upper skin 30.

Figure 24:
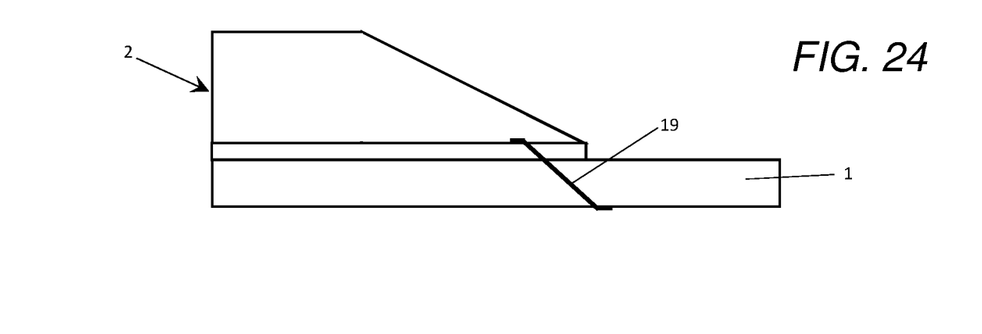
FIG. 24 shows a tuft with non-protruding ends.

The ends of the tufts in FIGS. 1-23 are shown protruding from the composite structure. In some applications this may be acceptable, but in the case of an aircraft wing as in FIG. 23, ideally the end of each tuft is bent so as to be flush with the surface, as shown by the single tuft 19 in FIG. 24. This is particularly important on the outer aerodynamic surface of the wing skin.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A panel assembly comprising:
a panel;
a stringer comprising a stringer foot and an upstanding stringer web, wherein the stringer foot comprises a flange which extends in a widthwise direction between the stringer web and a lateral edge and in a lengthwise direction alongside the stringer web, wherein the stringer extends in the lengthwise direction between a pair of ends and wherein one of the ends of the stringer comprises a foot run-out which extends in the lengthwise direction between the flange and a tip of the stringer foot, wherein the foot run-out is bonded to the panel at a foot run-out interface;

reinforcement elements which pass through the foot run-out interface, wherein at least some of the reinforcement elements are inclined relative to the foot run-out interface; and wherein the panel has a surface, and an end of each reinforcement element is bent so as to be flush with the surface of the panel.

2. The panel assembly of claim 1 wherein at least some of the reinforcement elements are inclined at an oblique angle of inclination relative to the foot run-out interface and in a direction of inclination which is either towards or away from the tip of the stringer foot and defines an angle of azimuth relative to the lengthwise direction, wherein the angle of azimuth is between −45° and +45°.

3. The panel assembly of claim 2 wherein the angle of azimuth is between −20° and +20°.

4. The panel assembly of claim 1 wherein at least some of the reinforcement elements are inclined at an oblique angle of inclination relative to the foot run-out interface and in a direction of inclination which defines an angle of azimuth relative to the lengthwise direction, wherein the angle of azimuth varies between the reinforcement elements.

5. The panel assembly of claim 1 wherein some of the reinforcement elements are inclined towards the tip of the stringer foot, and some of the reinforcement elements are inclined away from the tip of the stringer foot.

6. The panel assembly of claim 1 wherein the reinforcement elements are bonded to the foot run-out and/or the panel.

7. The panel assembly of claim 1 wherein the reinforcement elements are tufts or Z-pins.

8. The panel assembly of claim 1 wherein each of the reinforcement elements has a diameter less than 2 mm.

9. The panel assembly of claim 1 wherein the foot run-out comprises multiple plies; and the reinforcement elements pass through some or all of the plies of the foot run-out.

10. The panel assembly of claim 1 wherein the panel comprises multiple plies; and the reinforcement elements pass through some or all of the plies of the panel.

11. The panel assembly of claim 1 wherein the stringer web upstands by a maximum height H from the stringer foot, and at least some of the reinforcement elements are spaced from the tip of the stringer foot at the point of passing through the foot run-out interface by a distance less than H.

12. The panel assembly of claim 1 wherein the stringer web comprises a web run-out which upstands by a height from the stringer foot and terminates at a tip of the stringer web, the height of the web run-out reduces towards the tip of the stringer web, and the foot run-out coincides with the web run-out.

13. The panel assembly of claim 1 wherein the panel has a thickness at the foot run-out interface, and at least some of the reinforcement elements are spaced from the tip of the stringer foot at the point of passing through the foot run-out interface by a distance less than the thickness of the panel at the foot run-out interface.

14. An aircraft wing comprising an upper skin and a lower skin, wherein the upper skin comprises a panel assembly comprising a panel;

a stringer comprising a stringer foot and an upstanding stringer web, wherein the stringer foot comprises a flange which extends in a widthwise direction between the stringer web and a lateral edge and in a lengthwise direction alongside the stringer web, wherein the stringer extends in the lengthwise direction between a pair of ends and wherein one of the ends of the stringer comprises a foot run-out which extends in the lengthwise direction between the flange and a tip of the stringer foot, wherein the foot run-out is bonded to the panel at a foot run-out interface;

reinforcement elements which pass through the foot run-out interface, wherein at least some of the reinforcement elements are inclined relative to the foot run-out interface, wherein the reinforcement elements in the upper skin each have a first portion in the foot run-out and a second portion in the panel, and all or a majority of the reinforcement elements which pass through the foot run-out interface in the upper skin are inclined in a direction of inclination which is towards the tip of the stringer foot so that the first portion is closer to the tip of the stringer foot than the second portion.

15. An aircraft wing according to claim 14, wherein the lower skin comprises a panel assembly comprising:

a panel, a stringer comprising a stringer foot and an upstanding stringer web, wherein the stringer foot comprises a flange which extends in a widthwise direction between the stringer web and a lateral edge and in a lengthwise direction alongside the stringer web, wherein the stringer extends in the lengthwise direction between a pair of ends and wherein one of the ends of the stringer comprises a foot run-out which extends in the lengthwise direction between the flange and a tip of the stringer foot, wherein the foot run-out is bonded to the panel at a foot run-out interface; reinforcement elements which pass through the foot run-out interface, wherein at least some of the reinforcement elements are inclined relative to the foot run-out interface, the reinforcement elements in the lower skin each have a first portion in the foot run-out and a second portion in the panel, and all or a majority of the reinforcement elements which pass through the foot run-out interface in the lower skin are inclined in a direction of inclination which is away from the tip of the stringer foot so that the first portion is further from the tip of the stringer foot than the second portion.

16. An aircraft wing comprising an upper skin and a lower skin, wherein the lower skin comprises a panel assembly comprising a panel;

a stringer comprising a stringer foot and an upstanding stringer web, wherein the stringer foot comprises a flange which extends in a widthwise direction between the stringer web and a lateral edge and in a lengthwise direction alongside the stringer web, wherein the stringer extends in the lengthwise direction between a pair of ends and wherein one of the ends of the stringer comprises a foot run-out which extends in the lengthwise direction between the flange and a tip of the stringer foot, wherein the foot run-out is bonded to the panel at a foot run-out interface;

reinforcement elements which pass through the foot run-out interface, wherein at least some of the reinforcement elements are inclined relative to the foot run-out interface, wherein the reinforcement elements in the lower skin each have a first portion in the foot run-out and a second portion in the panel, and all or a majority of the reinforcement elements which pass through the foot run-out interface in the lower skin are inclined in a direction of inclination which is away from the tip of the stringer foot so that the first portion is further from the tip of the stringer foot than the second portion.

17. An aircraft comprising a panel assembly according to claim 1.

\* \* \* \* \*